United States Patent
Zhang (10) Patent No.: US 11,392,341 B2
(45) Date of Patent: Jul. 19, 2022

(54) DISPLAY SWITCHING METHOD FOR SMART DISPLAY TERMINAL, DEVICE, EQUIPMENT AND STORAGE MEDIUM

(71) Applicant: SHENZHEN CHUANGWEI-RGB ELECTRONICS CO., LTD., Shenzhen (CN)

(72) Inventor: Xin Zhang, Shenzhen (CN)

(73) Assignee: SHENZHEN CHUANGWEI-RGB ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 17/253,994

(22) PCT Filed: Oct. 30, 2020

(86) PCT No.: PCT/CN2020/125549
§ 371 (c)(1),
(2) Date: Mar. 11, 2021

(87) PCT Pub. No.: WO2021/196591
PCT Pub. Date: Oct. 7, 2021

(65) Prior Publication Data
US 2022/0050651 A1 Feb. 17, 2022

(30) Foreign Application Priority Data
Apr. 2, 2020 (CN) .......................... 202010256973.7

(51) Int. Cl.
*G06F 3/147* (2006.01)
(52) U.S. Cl.
CPC .................... *G06F 3/147* (2013.01)
(58) Field of Classification Search
CPC .......... G06F 3/147; G06F 3/14; G06F 3/1423; H04N 21/4307
See application file for complete search history.

(56) References Cited

U.S. PATENT DOCUMENTS

| 2018/0203660 A1* | 7/2018 | Hwang | G06F 3/1446 |
| 2021/0152879 A1* | 5/2021 | Choi | H04N 21/482 |
| 2021/0185365 A1* | 6/2021 | Chan | H04N 21/47217 |

FOREIGN PATENT DOCUMENTS

| CN | 103686432 A | 3/2014 |
| CN | 103780930 A | 5/2014 |

(Continued)

OTHER PUBLICATIONS

International Search Report dated Jan. 27, 2021 of counterpart PCT application PCT/CN2020/125549.

(Continued)

*Primary Examiner* — Koosha Sharifi-Tafreshi
(74) *Attorney, Agent, or Firm* — Platinum Intellectual Property LLP (57) ABSTRACT

The present disclosure provides display switching method, device and equipment for an intelligent display terminal and a storage medium, and belongs to the technical field of artificial intelligence. The method comprises: receiving a display switch request sent by a first intelligent display terminal, wherein the display switch request comprises purpose information of the display switch and display content information, the display content information is content information displayed by a first intelligent display terminal; determining a target intelligent display terminal according to the purpose information of the display switch; and according to the display content information, sending a data stream corresponding to the display content information to the target intelligent display terminal, wherein the data stream corresponding to the display content information is used for enabling the target intelligent display terminal to display the display content of the first intelligent display terminal. By switching the display content of the first intelligent display terminal to the target intelligent display terminal to display, (Continued)

seamless connection of the display content between different intelligent display terminals is realized, and the user experience is improved.

14 Claims, 4 Drawing Sheets

(56) References Cited

FOREIGN PATENT DOCUMENTS

| CN | 103841460 A | 6/2014 |
|---|---|---|
| CN | 105828139 A | 8/2016 |
| CN | 106911948 A | 6/2017 |
| CN | 108268228 A | 7/2018 |
| CN | 110913278 A | 3/2020 |
| CN | 111596558 A | 8/2020 |
| JP | 2016103810 A | 6/2016 |

OTHER PUBLICATIONS

ISA Written Opinion dated Jan. 22, 2021 of counterpart PCT application PCT/CN2020/125549.
The First Office Action by CNIPA dated Mar. 3, 2021 of the counterpart Chinese Patent Application No. 202010256973.7.
The Search Results by CNIPA of the counterpart Chinese Patent Application No. 202010256973.7.
The Second Office Action by CNIPA of the counterpart Chinese Patent Application No. 202010256973.7.

\* cited by examiner

DISPLAY SWITCHING METHOD FOR SMART DISPLAY TERMINAL, DEVICE, EQUIPMENT AND STORAGE MEDIUM

CROSS-REFERENCE TO RELATED APPLICATIONS

This application is a United States National Stage Application filed under 35 U.S.C 371 of PCT Patent Application Serial No. PCT/CN2020/125549, filed Oct. 30, 2020, which claims priority to Chinese Patent Application No. 2020102569737 filed with the Chinese Patent Office on Apr. 2, 2020, entitled "Display Switching Method for Smart Display Terminal, Device, Equipment and Storage Medium", which is incorporated herein by reference in its entirety.

TECHNICAL FIELD

The present disclosure relates to the field of artificial intelligence (AI), in particular, to the display switching method (the display switching method for smart display terminal), device and equipment for an intelligent display terminal and a storage medium.

BACKGROUND ART

With the development of voice recognition technology, the voice recognition technology is introduced into more and more intelligent household appliances. A user needs to wake up the voice recognition function of the intelligent household appliance by shouting wake-up words, to realize the wake-up function.

In related technologies, if a user wants to go to another scene from the current scene, the user still needs to continue watching the display content of the current equipment, the user needs to wake up a target equipment in another scene in a voice wake-up manner in another scene, and re-imports the display content of the current equipment on the target equipment and adjusts the viewing progress of the display content.

However, if the user wakes up the target equipment in another scene, re-imports the display content of the current equipment on the target equipment and adjusts the viewing progress, the user cannot realize the seamless connection of the display contents among different scenes, and thus wastes a lot of time.

SUMMARY

One of objects of the present disclosure includes providing display switching method, device and equipment for an intelligent display terminal and a storage medium, which can achieve switching display contents between different equipment in different scenes, realize seamless connection of the display contents among different intelligent display terminals, and thereby improves user experience.

The embodiments of the present disclosure are achieved by the following methods.

One aspect of the embodiments of the present disclosure provides a display switching method for an intelligent display terminal, and the method comprises:

receiving a display switch request sent by a first intelligent display terminal, wherein the display switch request comprises: purpose information of the display switch and display content information; and the display content information is the content information displayed by the first intelligent display terminal;

determining a target intelligent display terminal according to the purpose information of the display switch; and according to the display content information, sending a data stream corresponding to the display content information to the target intelligent display terminal, wherein the data stream corresponding to the display content information is configured so that the target intelligent display terminal displays the display content of the first intelligent display terminal.

In a possible implementation, the first intelligent display terminal is an intelligent display terminal in a first scene area, and the purpose information of the display switch comprises an identifier of a second scene area;

the determining the target intelligent display terminal according to the purpose information of the display switch comprises:

according to the identifier of the second scene area, obtaining an equipment identifier in the second scene area from a preset database; and determining the target intelligent display terminal from the equipment in the second scene area.

In a possible implementation, if the second scene area comprises multiple intelligent display terminals, the purpose information of the display switch also comprises an identifier of a second intelligent display terminal.

The determining the target intelligent display terminal from the equipment in the second scene area comprises:

matching the identifier of the second intelligent display terminal in the equipment identifiers in the second scene area; and if the matching passes, determining the second intelligent display terminal from the equipment in the second scene area as the target intelligent display terminal.

In a possible implementation, the identifier of the second intelligent display terminal comprises the name of the second intelligent display terminal, the address information of the second intelligent display terminal, the mac address of the second intelligent display terminal and the IP address of the second intelligent display terminal.

In a possible implementation, before the sending the data stream corresponding to the display content information to the target intelligent display terminal according to the display content information, the method further comprises:

sending switch confirmation information to the first intelligent display terminal, wherein the switch confirmation information is configured so that the first intelligent display terminal closes the display content.

In a possible implementation, the display content information comprises at least one of the following information: the name of the display content, the play progress of the display content, and the resource index of the display content.

In a possible implementation, if the display content information comprises the play information of the display content, the data stream corresponding to the display content comprises the data stream of the displayed part, or the data stream of the part to be displayed in the resource corresponding to the display content.

In a possible implementation, if the display content is dynamic display content, the data stream corresponding to the display content is the data stream of the part to be displayed;

or, if the display content is static display content, the data stream corresponding to the display content is the data stream of the displayed part.

In a possible implementation, before the receiving the display switch request sent by the first intelligent display terminal, the method further comprises:

receiving equipment information sent by the multiple intelligent display terminals, wherein the equipment information of each intelligent display terminal comprises the identifier of each intelligent display terminal, and the identifier of the scene area where each intelligent display terminal is located.

In a possible implementation, the equipment information of each intelligent display terminal further comprises the address information of each intelligent display terminal;

before the sending the data stream corresponding to the display content information to the target intelligent display terminal according to the display content information, the method further comprises:

according to the identifier of the second intelligent display terminal, determining the address information of the second intelligent display terminal; and the sending the data stream corresponding to the display content information to the target intelligent display terminal according to the display content information comprises:

according to the display content information and the address information of the second intelligent display terminal, sending the data stream corresponding to the display content information to the target intelligent display terminal.

Another aspect of the embodiment of the present disclosure further provides a display switching method for an intelligent display terminal, comprising:

according to an input switch instruction, generating a display switch request, wherein the display switch request comprises the purpose information of display switch and display content information; and the display content information is the content information displayed by the first intelligent display terminal; and sending the display switch request to a server, wherein the display switch request is configured so that the server determines the target intelligent display terminal according to the purpose information of the display switch, and sends the data stream corresponding to the display content information to the target intelligent display terminal according to the display content information, so that the target intelligent display terminal displays the display content of the first intelligent display terminal.

In a possible implementation, before the generating a display switch request according to the input switch instruction, the method further comprises:

receiving the switch instruction input by means of voice; or receiving the switch instruction input by a control gesture; or receiving the switch instruction input by means of a touch control; or receiving the switch instruction input by an input equipment.

Another aspect of the embodiment of the present disclosure further provides a display switching device for an intelligent display terminal, comprising:

a receiving module, configured to receive the display switch request sent by a first intelligent display terminal, wherein the display switch request comprises purpose information of the display switch and display content information; and the display content information is the content information displayed at the first intelligent display terminal;

a determining module, configured to determine a target intelligent display terminal according to the purpose information of the display switch; and a display module, configured to send the data stream corresponding to the display content information to the target intelligent display terminal according to the display content information, wherein the data stream corresponding to the display content information is configured so that the target intelligent display terminal displays the display content of the first intelligent display terminal.

In a possible implementation, the first intelligent display terminal is the intelligent display terminal in the first scene area, and the purpose information of the display switch comprises an identifier of the second scene area; and the determining module is further configured to obtain the equipment identifier in the second scene area from the preset database according to the identifier of the second scene area, and determine the target intelligent display terminal from the equipment in the second scene area.

In a possible implementation, if the second scene area comprises multiple intelligent display terminals, the purpose information of the display switch further comprises the identifier of the second intelligent display terminal; and the determining module is further configured to match the identifier of the second intelligent display terminal in the equipment identifier of the second scene area, and determine the second intelligent display terminal as the target intelligent display terminal from the equipment in the second scene area if the matching passes.

In a possible implementation, the device further comprises:

a close module, configured to send switch confirmation information to the first intelligent display terminal, wherein the switch confirmation information is configured so that the first intelligent display terminal closes the display content.

In a possible implementation, the display content information comprises at least one of the following information: the name of the display content, the play progress of the display content and the resource index of the display content.

In a possible implementation, if the display content information comprises the play information of the display content, the data stream corresponding to the display content comprises the data stream of the displayed part, or the data stream of the part to be displayed in the resources corresponding to the display content.

In a possible implementation, if the display content is dynamic display content, the data stream corresponding to the display content is the data stream of the part to be displayed; or if the display content is static display content, the data stream corresponding to the display content is the data stream of the displayed part.

In a possible implementation, the device further comprises:

the receiving module, further configured to receive the equipment information sent by the multiple intelligent display terminals, wherein the equipment information of each intelligent display terminal comprises the identifier of each intelligent display terminal, and the identifier of the scene area where each intelligent display terminal is located.

In a possible implementation, the equipment information of each intelligent display terminal further comprises the address information of each intelligent display terminal, and the device further comprises:

a determining module, further configured to determine the address information of the second intelligent display terminal according to the identifier of the second intelligent display terminal.

The display module is specifically configured to send the data stream corresponding to the display content information to the target intelligent display terminal according to the display content information and the address information of the second intelligent display terminal.

The embodiment of the present disclosure further provides the display switching device for the intelligent display terminal, and the device comprises:

a generating module, generating a display switch request according to an input switch instruction, wherein the display switch request comprises the purpose information of display switch and display content information, wherein the display content information is the content information displayed by the first intelligent display terminal;

a sending module, configured to send the display switch request to a server, wherein the display switch request is configured so that the server determines the target intelligent display terminal according to the purpose information of the display switch, and sends the data stream corresponding to the display content information to the target intelligent display terminal according to the display content information, so that the target intelligent display terminal displays the display content of the first intelligent display terminal.

In a possible implementation, the device further comprises:

a receiving module, further configured to receive the switch instruction input by means of voice; or receive the switch instruction input by a control gesture; or receive the switch instruction input by means of touch control; or receive the switch instruction input by an input equipment.

The embodiment of the present disclosure further provides a display switching equipment, comprising a memory and a processor, wherein the memory stores a computer program that can run on the processor, and when the processor executes the computer program, the steps of the above display switching method for the intelligent display terminal is implemented.

The embodiment of the present disclosure further provides a storage medium, the storage medium stores the computer program, and the computer program, when run by the processor, executes the steps of the above display switching method for the intelligent display terminal.

One of the advantages of the embodiment of the present disclosure comprises:

the embodiments of the present disclosure provide display switching method, device and equipment for an intelligent display terminal and a storage medium, through receiving the display switch request sent by the first intelligent display terminal, wherein the display switch request comprises the purpose information of the display switch and the display content information, and the display content information is the content information displayed at the first intelligent display terminal; determining the target intelligent display terminal according to the purpose information of the display switch; according to the display content information, sending the data stream corresponding to the display content information to the target intelligent display terminal, wherein the data stream corresponding to the display content information is configured so that the target intelligent display terminal displays the display content of the first intelligent display terminal. The display is implemented by switching the display content of the first intelligent display terminal to the target intelligent display terminal, and thus the seamless connection of the display contents between different intelligent display terminals is achieved and user experience is improved.

BRIEF DESCRIPTION OF DRAWINGS

In order to more clearly illustrate technical solutions of embodiments of the present disclosure, accompanying drawings which need to be used in the embodiments will be introduced briefly below, and it should be understood that the accompanying drawings below merely show some embodiments of the present disclosure, therefore, they should not be considered as limitation to the scope, and those ordinarily skilled in the art still could obtain other relevant drawings according to these accompanying drawings, without using any inventive effort.

DETAILED DESCRIPTION OF EMBODIMENTS

In order to make objects, technical solutions and advantages of the embodiments of the present disclosure clearer, the technical solutions in the embodiments of the present disclosure will be described clearly and completely below in conjunction with accompanying drawings in the embodiments of the present disclosure. Obviously, each implementation method introduced in the prescribed embodiment is only a part of the possible implementation methods instead of all the implementation methods. Generally, the components in the embodiments of the present disclosure as described and illustrated in the accompanying drawings herein can be arranged and designed by different configurations.

Therefore, the following specific description to the embodiments of the present disclosure as provided in the accompanying drawings is not intended to limit the scope of protection of the claims, while it only indicates the possible embodiments of the present disclosure. Based on the embodiments of the present disclosure, all the other embodiments obtained by a person skilled in the art without spending any inventive effort belong to the protection scope of the present disclosure.

It should be reminded that the same reference signs and letters in the following accompanying drawings indicate the same terms, and therefore, as along as a term is defined in a figure, it need not be further defined or explained in the figures thereafter.

In the disclosure of the present disclosure, it should be explained that the terms such as "first", "second" and "third" are only intended for differentiated description and shall not be construed as indicating or implying relative importance.

The display switching method for each intelligent display terminal provided in the following can be achieved by intelligent display terminals, and the specific product forms of the intelligent display terminals can be an intelligent screen, an intelligent display screen, an intelligent TV, or other electronic equipment with intelligent display functions, e.g., household appliances such as refrigerator and kitchen ventilator with an intelligent screen.

Figure 1:
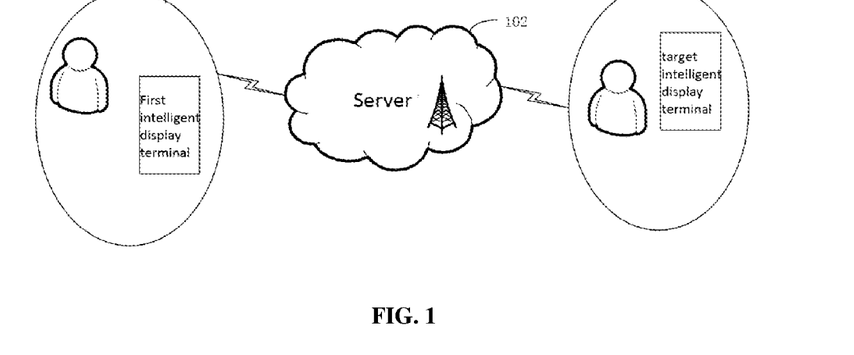
FIG. 1 is a schematic view of the structure of the display switching system for an intelligent display terminal provided in the present disclosure.

FIG. 1 is a schematic view of the structure of the display switching system for an intelligent display terminal provided in the present disclosure, as shown in FIG. 1, the system comprises a first intelligent display terminal 101, a server 102 and a target intelligent display terminal 103, wherein the server 102 is respectively connected with the first intelligent display terminal 101 and the target intelligent display terminal 103.

In the above, the first intelligent display terminal 101 can be disposed in a first scene area, the target intelligent display terminal 103 can be disposed in a second scene area, wherein the first scene and the second scene can both comprise scenes such as a living room and a kitchen, to switch the display content of the first intelligent display terminal 101 in the first scene area to the target intelligent display terminal 103 in the second scene area, so that the target intelligent display terminal 103 can finally display the display content of the first intelligent display terminal 101.

Figure 2:
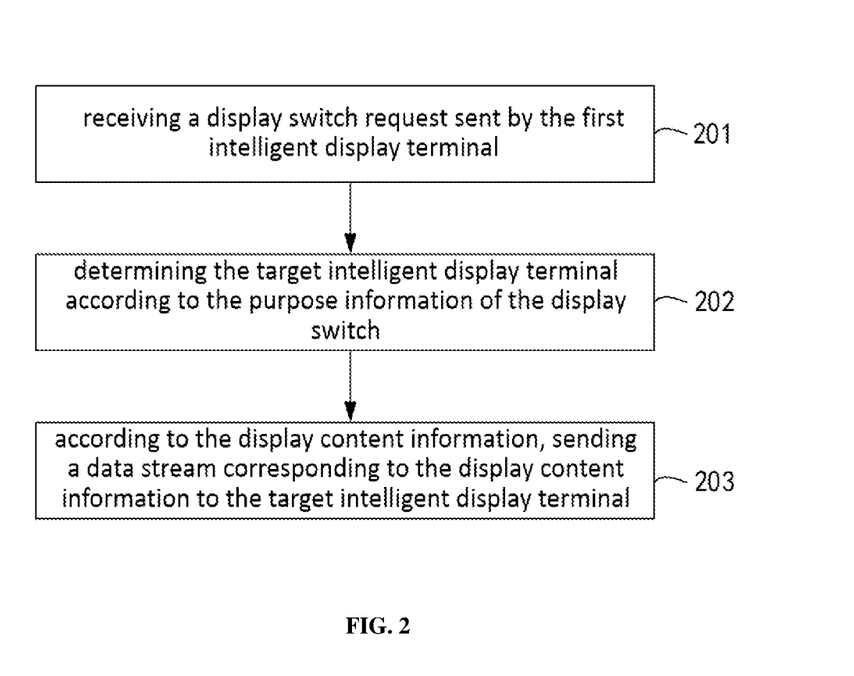
FIG. 2 is a schematic view of the flow of the display switching method for an intelligent display terminal provided in the present disclosure.

FIG. 2 is a schematic view of the flow of the display switching method for an intelligent display terminal provided in the present disclosure, configured to be the server in the above display switching system for the intelligent display terminal, as shown in FIG. 2, the method comprises following steps.

In step 201, a display switch request sent by the first intelligent display terminal is received.

In the above, the display switch request comprises the purpose information of display switch and the display content information; the display content information is the content information displayed by the first intelligent display terminal and the display switch request is the request sent by the first intelligent display terminal in response to the switch instruction input by a user; and the display content information comprises at least one of the following information: the name of the display content, the play progress of the display content, and the resource index of the display content.

Optionally, the purpose information of the display switch can comprise the name of the target intelligent display terminal for display switch and the information of the first intelligent display terminal, and the display content information can be the display content of the first intelligent display terminal.

For example, the display switch request can specifically indicate that the first intelligent display terminal is an intelligent TV, and the display content information can be the TV series content currently displayed on the intelligent TV, for example, the $30^{th}$ second of episode 22 of a TV series named xxxxxxxxx; and the target intelligent display terminal can be an intelligent refrigerator display screen, wherein the $30^{th}$ second of episode 22 indicates the play progress of the display content.

In step 202, the target intelligent display terminal is determined according to the purpose information of the display switch.

In the above, the purpose information of the display switch comprises the name of the target intelligent display terminal.

For example, the target intelligent display terminal is the intelligent refrigerator display screen, and the purpose information of the display switch is the name of "intelligent refrigerator display screen" of the target intelligent display terminal. The target intelligent display terminal can be determined according to the purpose information of the display switch.

In step 203, according to the display content information, a data stream corresponding to the display content information is sent to the target intelligent display terminal.

In the above, the display content information is the data stream corresponding to the display content of the first intelligent display terminal, and if the display content information comprises the play information of the display content, the data stream corresponding to the display content comprises the data steam of the displayed part, or the data stream of the part to be displayed in the resource corresponding to the display content.

Optionally, according to the display content, the server sends the data stream corresponding to the display content information to the target intelligent display terminal, so that the target intelligent display terminal displays the data stream corresponding to the display content information of the first intelligent display terminal; the data steam of the displayed part in the resource corresponding to the display content indicates the content displayed in the first intelligent display terminal and watched by the user; and the data stream of the part to be displayed indicates the content to be displayed in the first intelligent display terminal and not watched by the user.

For example, the display content of the first intelligent display terminal is the $22^{nd}$ minute of episode 10 of a TV series named xxxxxxxxx, the server sends the data stream corresponding to the display content information to the target intelligent terminal according to the display content information, and the data stream corresponding to the display can comprise the data stream of the displayed part before the $22^{nd}$ minute of the episode 10 of the TV series named xxxxxxxxx, or the data stream of the part to be displayed following the $22^{nd}$ minute of the episode 10 of the TV series named xxxxxxxxx; and the data stream corresponding to the display is configured so that the target intelligent display terminal continues to display the content of the $22^{nd}$ minute of the episode 10 of the TV series named xxxxxxxxx and the content following the $22^{nd}$ minute of the episode 10 of the TV series named xxxxxxxxx, and the user can continue to watch the content of the $22^{nd}$ minute of the episode 10 and the content following the $22^{nd}$ minute of the episode 10 of the TV series named xxxxxxxxx of the display content of the first intelligent display terminal in the first scene area on the target intelligent display terminal in the second scene area.

To sum up, the embodiment of the present disclosure provides the display switching method for an intelligent display terminal, and through receiving the display switch request sent by the first intelligent display terminal, wherein the display switch request comprises the purpose information of the display switch and the display content information, and the display content information is the content information displayed in the first intelligent display terminal; determining the target intelligent display terminal according to the purpose information of the display switch; according to the display content information, sending the data stream corresponding to the display content information to the target intelligent display terminal, wherein the data stream corresponding to the display content information is configured so that the target intelligent display terminal displays the display content of the first intelligent display terminal. Seamless connection of display contents between different intelligent display terminals is achieved by switching the display content of the first intelligent display terminal to the target intelligent display terminal to display, and the user experience is also improved.

Figure 3:
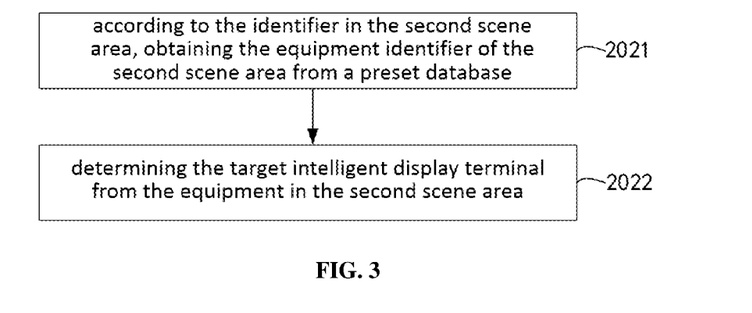
FIG. 3 is a schematic view of the flow of the display switching method for an intelligent display terminal provided in the present disclosure.

FIG. 3 is a schematic view of the flow of the display switching method for an intelligent display terminal provided in the present disclosure, wherein the first intelligent display terminal is the intelligent display terminal in the first scene area; the purpose information of the display switch comprises the identifier of the second scene area that comprises a keyword, which indicates the name of the second scene area, for example, the first scene area can be living room and the second scene area can be kitchen, the first intelligent display terminal can be an intelligent TV in the living room, and the target intelligent display terminal can be an intelligent refrigeration display screen in the kitchen.

As shown in FIG. 3, step 202 comprises:

step 2021, obtaining, according to the identifier of the second scene area, the equipment identifier in the second scene area from a preset database.

In the above, each scene area comprises multiple display terminals, the equipment identifier of each of the multiple display terminals is pre-stored in the preset database, and the equipment identifier comprises the keyword, which is configured to indicate the name of the equipment, for example, the second scene area can be kitchen, and then the intelligent display terminal in the second scene area can comprise a plurality of intelligent display terminals such as an intelligent kitchen ventilator display screen, an intelligent refrigerator display screen and an intelligent microwave oven display screen, and the server can put forward a keyword according to the identifier of the second scene area, for example, if the keyword is "kitchen", the equipment identifiers of all the intelligent display terminals in the kitchen is acquired from the preset database.

In step 2022, the target intelligent display terminal is determined from the equipment in the second scene area.

Optionally, according to the purpose information of the display switch, the target intelligent display terminal is further determined from a plurality of equipment in the second scene area, and the target intelligent display terminal can be any display terminal in the second scene area.

For example, the second scene area is kitchen, and the plurality of equipment in kitchen area comprise an intelligent refrigerator display screen, an intelligent kitchen ventilator display screen, an intelligent microwave oven display screen and the like in the kitchen, and the target intelligent display terminal can be any intelligent display terminal of the plurality of intelligent display terminals in the kitchen area.

Figure 4:
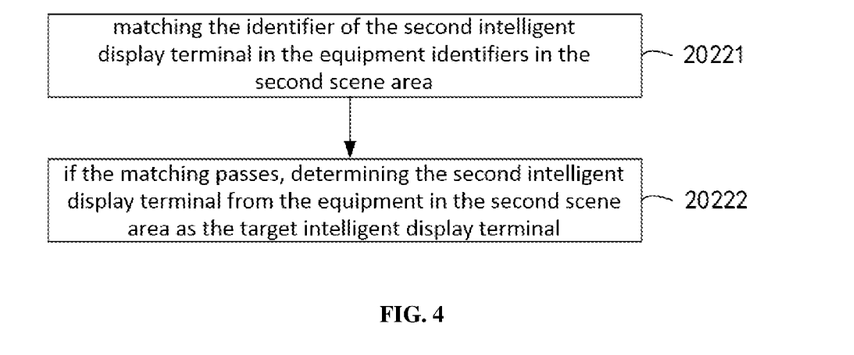
FIG. 4 is a schematic view of the flow of the display switching method for an intelligent display terminal provided in the present disclosure.

FIG. 4 is a schematic view of the flow of the display switching method for an intelligent display terminal provided in the present disclosure; as shown in FIG. 4, the above step 2022 comprises:

step 20221, matching the identifier of the second intelligent display terminal in the equipment identifiers in the second scene area.

In the above, if the second scene area comprises a plurality of intelligent display terminals, the equipment identifiers in the second scene area comprise the name of each intelligent display terminal in the second scene area, and the identifier of the second intelligent display terminal comprises the name of the second intelligent display terminal.

Optionally, when the second scene area comprises a plurality of intelligent display terminals, in order to determine the target intelligent display terminal from the plurality of intelligent display terminals, the purpose information of the display switch further comprises the identifier of the second intelligent display terminal, so as to determine the target intelligent display terminal from the plurality of intelligent display terminals according to the identifier of the second intelligent display terminal.

For example, the second scene area is kitchen, and the plurality of intelligent display terminals in the kitchen area comprise an intelligent refrigerator display screen, an intelligent kitchen ventilator display screen, an intelligent microwave oven display screen and the like in the kitchen, and the identifier information of the second intelligent display terminal can comprise the name of the second intelligent display terminal, such as "intelligent refrigerator display screen"; then whether the identifier information of "intelligent refrigerator display screen" exists is matched in the equipment identifiers of the second scene area contained in the database, and the target intelligent display terminal is further determined according to the matching result.

Step 20222, if the matching passes, the second intelligent display terminal is determined from the equipment in the second scene area as the target intelligent display terminal.

Optionally, the identifier of the second intelligent display terminal is matched in the equipment identifiers of the second scene area, and if the matching result indicates that the identifier of the second intelligent display terminal exists in the plurality of equipment identifiers of the second scene area, then the second intelligent display terminal is determined as the target intelligent display terminal. If the matching result indicates that the identifier of the second intelligent display terminal does not exist in the equipment identifiers of the second scene area, then the matching fails.

For example, continuing for the above example, if the identifier information of the second intelligent display terminal in the equipment of the second scene area is the "intelligent refrigerator display screen", and if the name of the equipment identifier of the second scene area has the "intelligent refrigerator display screen", the intelligent refrigerator display screen is used as the target intelligent display terminal.

Optionally, before the sending the data stream corresponding to the display content information to the target intelligent display terminal according to the display content information, the display switching method for the intelligent display terminal further comprises sending switch confirmation information to the first intelligent display terminal.

In the above, the switch confirmation information is configured so that the first intelligent display terminal closes the display content.

Optionally, when the user needs to go from the first scene area to the second scene area, the server receives the display switch request sent by the first intelligent display terminal, and determines the target intelligent display terminal according to the purpose information of the display switch, so that in the following the server can send the data stream corresponding to the display content information to the target intelligent display terminal; and at this moment, before sending the data stream corresponding to the display content information to the target intelligent display terminal, the server can send the switch confirmation information to the first intelligent display terminal, so that the first intelligent display terminal can close the display content of the first intelligent display terminal according to the switch confirmation information, so as to avoid wasting of resource when no one watches the display content of the first intelligent display terminal in the first scene area, and further closes the display content of the first intelligent display terminal to save electrical energy.

Optionally, before the receiving the display switch request sent by the first intelligent display terminal, the method comprises receiving the equipment information sent by the plurality of the intelligent display terminals, and the equipment information of each intelligent display terminal comprises the identifier of each intelligent display terminal and the identifier of the scene area wherein each intelligent display terminal is located.

In the above, the identifier of each intelligent display terminal comprises the name of each intelligent display terminal, and the identifier of the scene area where each intelligent display terminal is located can be the name of the scene area where each intelligent display terminal is located.

Optionally, each scene area comprises a plurality of intelligent display terminals, in order to switch the display content between the intelligent display terminals in different scene areas, the server needs to store the equipment information sent by each intelligent display terminal for treatment in the following steps.

For example, the first scene area can be living room, and the intelligent display terminals in the living room can comprise an intelligent TV, an intelligent air conditioner and the like; the second scene area can be kitchen, and the intelligent display terminals in the kitchen can comprise an intelligent refrigerator display screen, an intelligent kitchen ventilator display screen, an intelligent microwave oven display screen and the like, and each of the intelligent display terminals in different scene areas needs to send equipment information to the server, taking the intelligent TV for example, the first intelligent display terminal can be the intelligent TV in the living room, and then the "intelligent TV" is the identifier of the first intelligent display terminal, and the "living room" is the identifier of the scene area of the first intelligent display terminal.

Optionally, the equipment information of each intelligent display terminal further comprises the address information of each intelligent display terminal, which comprises the mac address (Media Access Control Address) and the IP (Internet Protocol) address of each intelligent display terminal; and according to the display content information, before the sending the data stream corresponding to the display content information to the target intelligent display terminal, the method comprises determining the address information of the second intelligent display terminal according to the identifier of the second intelligent display terminal.

In the above, the identifier of the second intelligent display terminal comprises the name of the second intelligent display terminal, the address information of the second intelligent display terminal, the mac address of the second intelligent display terminal and the IP address of the second intelligent display terminal.

Optionally, the server can carry out a look-up in the equipment identifiers of the second scene area according to the identifier of the second intelligent display terminal, and if the identifier of the second intelligent display terminal exists in the equipment identifiers of the second scene area, then the equipment information of the second intelligent display terminal can be obtained from the database, and the mac address and the IP address of the second intelligent display terminal are obtained from the equipment information of the second intelligent display terminal.

Optionally, before the sending the data stream corresponding to the display content information to the target intelligent display terminal according to the display content information, the method comprises sending the data stream corresponding to the display content information to the target intelligent display terminal according to the display content information and the address information of the second intelligent display terminal.

In the above, the display content information indicates the display content information of the first intelligent display terminal in the first scene area, and the data stream corresponding to the display content information indicates the current display progress of the first intelligent display terminal.

For example, the first scene area is living room, the first intelligent display terminal is an intelligent TV, and the target intelligent display terminal is the intelligent refrigerator display screen in the kitchen, and at this moment, the display content on the intelligent TV is the $20^{th}$ second of the $15^{th}$ minute of episode 22 of a TV series named xxxxxxxxx, the server can send the data stream corresponding to the display content information to the target intelligent display terminal according to the display content, so that the content of the $20^{th}$ second of the $15^{th}$ minute of episode 22 of the TV series named xxxxxxxxx can be displayed on the display screen of the refrigerator. The display content information in the first intelligent display terminal in the first scene area can be finally switched to the target intelligent display terminal in the second scene area to display, and thus a seamless connection of display content between different intelligent display terminals is achieved, and the user experience is improved.

Figure 5:
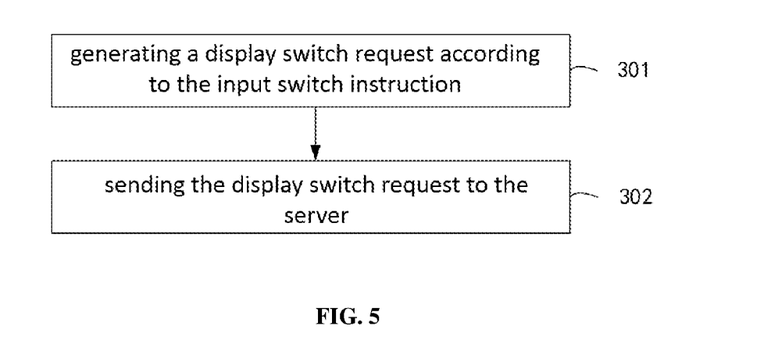
FIG. 5 is a schematic view of the flow of the display switching method for an intelligent display terminal provided in the present disclosure.

Referring to FIG. 5, the embodiment of the present disclosure also provides a schematic view of the flow of the display switching method for an intelligent display terminal, wherein the first intelligent display terminal is configured in the display switching system for the intelligent display terminal, comprising:

step 301, generating a display switch request according to the input switch instruction.

In the above, the display switch request comprises the purpose information of the display switch and the display content information, wherein the display content information is the content information displayed by the first intelligent display terminal, and the purpose information of the display switch comprises the identifier of the second scene area, if the second scene area comprises multiple intelligent display terminals, the purpose information of the display switch further comprises the identifier of the second intelligent display terminal; the display content information comprises at least one of the following information: the name of the display content, the play progress of the display content and the resource index of the display content; if the display content information comprises the play information of the display content, the data stream corresponding to the display content comprises the data stream of the displayed part, or the data stream of the part to be displayed in the resource corresponding to the display content; if the display content is dynamic display content, the data stream corresponding to the display content is the data stream of the part to be displayed; or if the display content is static display content, the data stream corresponding to the display content is the data stream of the displayed part.

Step 302, the display switch request is sent to the server.

In the above, the display switch request is configured so that the server determines the target intelligent display terminal according to the purpose information of the display switch, and sends the data stream corresponding to the display content information to the target intelligent display terminal according to the display content information, so that the target intelligent display terminal displays the display content of the first intelligent display terminal.

Before the generation of the display switch request according to the input switch instruction, the method comprises receiving the switch instruction input by means of voice, or receiving the switch instruction input by a control gesture, or receiving the switch instruction input by means of touch control, or receiving the switch instruction input by an input equipment.

Optionally, the switch instruction can be input by a plurality of methods, which can comprise a voice method, a gesture input and a touch control method.

For example, a user can input voice by the voice method, and specifically, the user can input by voice "display the content of currently played xxxxxxxxx on the intelligent refrigerator display screen in the kitchen" to the first intelligent display terminal, and the first intelligent display terminal can extract the keywords of "kitchen", "intelligent refrigerator display screen" and "display content information" to generate the display switch request.

A user can also input a switch instruction by a control gesture, for example, the user can input different gesture information of the user in the first intelligent display terminal, and each gesture represents corresponding semantic information, and a plurality of gesture information input by the user is stored, and the first intelligent display terminal can match the gesture input by the user with the plurality of previously stored gesture information when the user inputs the switch instruction by a control gesture, and if the matching passes, the semantic information corresponding to the gesture can be extracted according to the matching result, and the display switch request is generated according to the semantic information.

A user can also input the switch instruction by the touch control method, for example, the user can select by touch control the scene that needs to be switched and the purpose information corresponding to the scene on the first intelligent display terminal, for example, the first intelligent display terminal is an intelligent TV, the user can select by touch control on the intelligent TV that the scene is switched to the kitchen and the purpose information of the switch is the intelligent refrigerator display screen in the kitchen, and select the display content information. The display switch request is generated according to the switch instruction input by the touch control method.

A user can also input the switch instruction by an input equipment, for example, if the first scene is living room, the first intelligent display terminal is the intelligent TV in the living room, and the user can input the switch instruction by the remote control of the intelligent TV, and the switch request information is generated according to the switch instruction.

Figure 6:
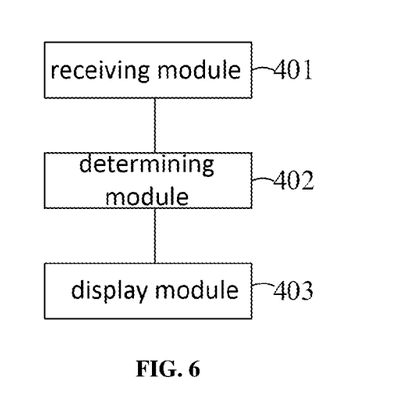
FIG. 6 is a schematic view of the structure of the display switching device for an intelligent display terminal provided in an embodiment of the present disclosure.

FIG. 6 is a schematic view of the structure of the display switching device for an intelligent display terminal provided in an embodiment of the present disclosure; and as shown in FIG. 6, the device comprises:

a receiving module 401, configured to receive a display switch request sent by a first intelligent display terminal, wherein the display switch request comprises the purpose information of display switch and the display content information; and the display content information is the content information displayed in the first intelligent display terminal;

a determining module 402, configured to determine a target intelligent display terminal according to the purpose information of the display switch; and a display module 403, configured to send the data stream corresponding to the display content information to the target intelligent display terminal according to the display content information, wherein the data stream corresponding to the display content information is configured so that the target intelligent display terminal displays the display content of the first intelligent display terminal.

Optionally, the first intelligent display terminal is the intelligent display terminal in the first scene area, and the purpose information of the display switch comprises the identifier of the second scene area; and the determining module 402 is specifically configured to obtain the equipment identifier in the second scene area from the preset database according to the identifier of the second scene area, and determine the target intelligent display terminal from the equipment in the second scene area.

Optionally, if the second scene area comprises multiple intelligent display terminals, the purpose information of the display switch further comprises the identifier of the second intelligent display terminal; and the determining module 402 is further specifically configured to match the identifier of the second intelligent display terminal in the equipment identifier of the second scene area, and determine the second intelligent display terminal as the target intelligent display terminal from the equipment in the second scene area if the matching passes.

Figure 7:
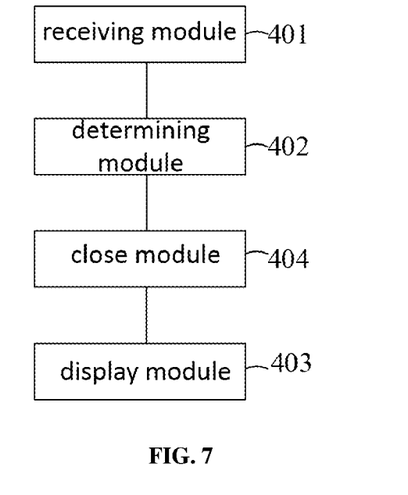
FIG. 7 is a schematic view of the structure of the display switching device for an intelligent display terminal provided in an embodiment of the present disclosure.

Optionally, referring to FIG. 7, the device further comprises:

a close module 404, configured to send switch confirmation information to the first intelligent display terminal, wherein the switch confirmation information is configured so that the first intelligent display terminal closes the display content.

Optionally, the display content information comprises at least one of the following information: the name of the display content, the play progress of the display content and the resource index of the display content.

Optionally, if the display content information comprises the play information of the display content, the data stream corresponding to the display content comprises the data stream of the displayed part, or the data stream of the part to be displayed in the resource corresponding to the display content.

Optionally, if the display content is dynamic display content, the data stream corresponding to the display content is the data stream of the part to be displayed; or if the display content is static display content, the data stream corresponding to the display content is the data stream of the displayed part.

Optionally, the device further comprises:

the receiving module 401, further configured to receive the equipment information sent by the multiple intelligent display terminals, wherein the equipment information of each intelligent display terminal comprises the identifier of each intelligent display terminal and the identifier of the scene area where each intelligent display terminal is located.

Optionally, the equipment information of each intelligent display terminal further comprises the address information of each intelligent display terminal, and the device further comprises:

the determining module 402, further configured to determine the address information of the second intelligent display terminal according to the identifier of the second intelligent display terminal; and the display module 403, specifically configured to send the data stream corresponding to the display content information to the target intelligent display terminal according to the display content information and the address information of the second intelligent display terminal.

To sum up, the embodiment of the present disclosure provides a display switching device for an intelligent display terminal, through receiving the display switch request sent by the first intelligent display terminal, wherein the display switch request comprises the purpose information of the display switch and the display content information, and the display content information is the content information displayed in the first intelligent display terminal; determining the target intelligent display terminal according to the purpose information of the display switch; according to the display content information, sending the data stream corresponding to the display content information to the target intelligent display terminal, wherein the data stream corresponding to the display content information is configured so that the target intelligent display terminal displays the display content of the first intelligent display terminal. Seamless connection of display content between different intelligent display terminals is achieved by switching the display content of the first intelligent display terminal to the target intelligent display terminal to display, and the user experience is improved.

Figure 8:
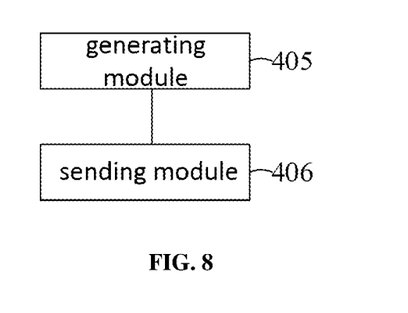
FIG. 8 is a schematic view of the structure of the display switching device for an intelligent display terminal provided in an embodiment of the present disclosure.

Referring to FIG. 8, the embodiment of the present disclosure further provides the display switching device for an intelligent display terminal, wherein the device comprises:

a generating module 405: a display switch request is generated according to the input switch instruction, wherein the display switch request comprises the purpose information of display switch and the display content information, and the display content information is the content information displayed by the first intelligent display terminal;

a sending module 406, configured to send a display switch request to a server, wherein the display switch request is configured so that the server determines the target intelligent display terminal according to the purpose information of the display switch, and sends the data stream corresponding to the display content information to the target intelligent display terminal according to the display content information, so that the target intelligent display terminal displays the display content of the first intelligent display terminal.

Figure 9:
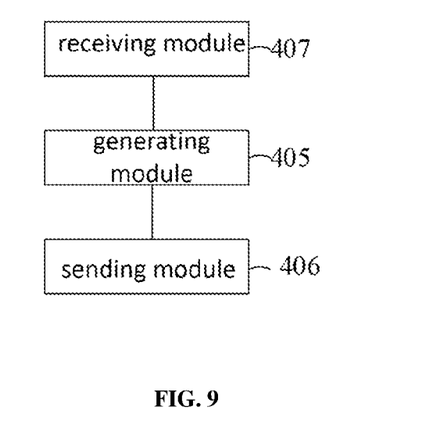
FIG. 9 is a schematic view of the structure of the display switching device for an intelligent display terminal provided in an embodiment of the present disclosure.

Optionally, referring to FIG. 9, the device further comprises:

a receiving module 407, configured to receive the switch instruction input by means of voice; or, receive the switch instruction input by control gesture; or, receive the switch instruction input by means of touch control; or, receive the switch instruction input by the input equipment.

The above device is configured to carry out the method provided by the preceding embodiments, and the implementation principle and technical effect are similar, and thus are not described here again.

The above modules can be configured to be one or multiple integrated circuits for implementing the above method, for example, one or multiple application specific integrated circuits (Application Specific Integrated Circuit, ASIC for short), or, one or multiple microprocessors (Digital Signal Processor, DSP for short), or, one or multiple field programmable gate arrays (Field Programmable Gate Array, FPGA for short), and the others. Moreover, for example, when one of the above modules is implemented in the form of scheduling a program code by a processing element, the processing element can be a universal processor, for example, a central processing unit (Central Processing Unit, CPU for short) or any other processor which can schedule the program code. Furthermore, for example, these modules can be integrated together and implemented in the form of a system-on-a-chip (SOC for short).

Figure 10:
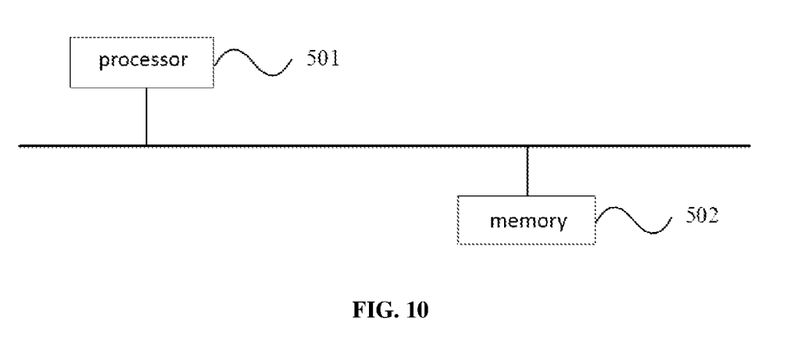
FIG. 10 is a schematic view of the structure of the display switching equipment provided in an embodiment of the present disclosure.

FIG. 10 is a schematic view of the structure of the display switching equipment provided in the present disclosure, and the display switching equipment can be a server, or an intelligent display terminal. If the display switching equipment is the server, then the steps of the method according to FIGS. 2-4 can be implemented; if the display switching equipment is the intelligent display terminal, then the steps of the method according to FIG. 5 can be implemented; and the display switching equipment comprise a memory 502 and a processor 501. The memory 502 and the processor 501 are connected to each other by bus.

The memory 502 is configured to store programs, and the processor 501 schedules the program stored in the memory 502 to execute the above method embodiment. The specific implementing method and technical effect are similar, and thus are not described here again.

Optionally, the present disclosure also provides a program product, for example, a computer readable storage medium, comprising a program, which is configured to execute the above method embodiment when the program is executed by the processor.

In some embodiments provided by the present disclosure, it should be understood that the disclosed device and method can be achieved by other methods. For example, the device embodiment as described above is only illustrative, for example, the division of the unit is only a division of logic functions, and there may be other division methods in actual implementation, for example, a plurality of units or components can be combined or integrated to another system, or some features can be ignored or are not implemented. In addition, the displayed or discussed mutual coupling, direct coupling or communication connection may be indirect coupling or communication connection through some interfaces, devices or units, and may be in electrical, mechanical or other forms.

The units described as separation components may be or may not be physically separated, and the components displayed as units may be or may not be physical units, that is, they may be located in some place, or they may be distributed on multiple network units. Some or all of the units may be selected according to actual needs to achieve the objects of the solutions of the present disclosure.

In addition, the functional units in each embodiment of the present disclosure may be integrated into one processing unit, or may exist physically as separate units, or two or more than two units may be integrated into one unit. The above-mentioned integrated unit can be realized in the form of hardware or in the form of hardware together with software functional units.

The above-mentioned integrated unit implemented in the form of a software functional unit may be stored in a computer readable storage medium. The above-mentioned software functional unit is stored in a storage medium, and includes several instructions to make a computer device (which may be a personal computer, a server, or a network device, etc.) or a processor execute a portion of the steps of the method in each embodiment of the present disclosure. The above-mentioned storage medium includes various medium that can store program codes, such as an U disk, a mobile hard disk, a read-only memory (Read-Only Memory, ROM for short), a random access memory (Random Access Memory, RAM for short), a magnetic disk or an optical disk.

The above-mentioned are merely specific embodiments of the present disclosure and the protection scope of the present disclosure is not limited thereto, and for any one skilled in the art, within the technical scope disclosed in the present disclosure, any changes or substitutions easily conceived shall be covered within the scope of protection of the present disclosure. Therefore, the scope of protection of the present disclosure shall be based on the scope of protection of the claims.

The above-mentioned are only preferred embodiments of the present disclosure and not intended to limit the present disclosure, and for one skilled in the art, various modifications and changes may be made to the present disclosure. Any modifications, equivalent substitutions, improvements and so on made within the spirit and principle of the present disclosure should be covered within the scope of protection of the present disclosure.

INDUSTRIAL APPLICABILITY

The embodiment of the present disclosure provides the display switching device for an intelligent display terminal, through receiving the display switch request sent by the first intelligent display terminal, wherein the display switch request comprises the purpose information of the display switch and the display content information, and the display content information is the content information displayed in the first intelligent display terminal; determining the target intelligent display terminal according to the purpose information of the display switch; according to the display content information, sending the data stream corresponding to the display content information to the target intelligent display terminal, wherein the data stream corresponding to the display content information is configured so that the target intelligent display terminal displays the display content of the first intelligent display terminal. Seamless connection of display contents between different intelligent display terminals is achieved by switching the display content of the first intelligent display terminal to the target intelligent display terminal to display, and the user experience is improved.

What is claimed is:

1. A display switching method for an intelligent display terminal, wherein the method comprises:
   receiving a display switch request sent by a first intelligent display terminal, wherein the display switch request comprises purpose information of a display switch and display content information, wherein the display content information is content information displayed by the first intelligent display terminal;
   determining a target intelligent display terminal according to the purpose information of the display switch; and
   sending, according to the display content information, a data stream corresponding to the display content information to the target intelligent display terminal, wherein the data stream corresponding to the display content information is configured so that the target intelligent display terminal displays a display content of the first intelligent display terminal,
   wherein the first intelligent display terminal is an intelligent display terminal in a first scene area, and the purpose information of the display switch comprises an identifier of a second scene area,
   wherein the determining a target intelligent display terminal according to the purpose information of the display switch comprises:
   obtaining, according to the identifier of the second scene area, an equipment identifier in the second scene area from a preset database; and
   determining the target intelligent display terminal from equipment in the second scene area.

2. The method according to claim 1, wherein if the second scene area comprises multiple intelligent display terminals, the purpose information of the display switch also comprises an identifier of a second intelligent display terminal,
   wherein the determining the target intelligent display terminal from equipment in the second scene area comprises:
   matching the identifier of the second intelligent display terminal in equipment identifiers in the second scene area, and
   if the matching passes, determining the second intelligent display terminal from the equipment in the second scene area as the target intelligent display terminal.

3. The method according to claim 2, wherein the identifier of the second intelligent display terminal comprises a name of the second intelligent display terminal, an address information of the second intelligent display terminal, a mac address of the second intelligent display terminal and an IP address of the second intelligent display terminal.

4. The method according to claim 1, wherein before the sending, according to the display content information, a data stream corresponding to the display content information to the target intelligent display terminal, the method further comprises:
   sending switch confirmation information to the first intelligent display terminal, wherein the switch confirmation information is configured so that the first intelligent display terminal closes the display content.

5. The method according to claim 1, wherein the display content information comprises at least one of following information: a name of the display content, a play progress of the display content, and a resource index of the display content.

6. The method according to claim 5, wherein if the display content information comprises play information of the display content, a data stream corresponding to the display content comprises a data stream of a displayed part, or a data stream of a part to be displayed in a resource corresponding to the display content.

7. The method according to claim 6, wherein if the display content is a dynamic display content, the data stream corresponding to the display content is the data stream of the part to be displayed; or
   if the display content is a static display content, the data stream corresponding to the display content is the data stream of the displayed part.

8. The method according to claim 2, wherein before the receiving a display switch request sent by a first intelligent display terminal, the method further comprises:

receiving equipment information sent by the multiple intelligent display terminals, wherein the equipment information of each of the intelligent display terminals comprises an identifier of each of the intelligent display terminals, and an identifier of a scene area where each of the intelligent display terminals is located.

9. The method according to claim 8, wherein the equipment information of each of the intelligent display terminals further comprises an address information of each of the intelligent display terminals, wherein before the sending, according to the display content information, a data stream corresponding to the display content information to the target intelligent display terminal, the method further comprises:

determining, according to the identifier of the second intelligent display terminal, an address information of the second intelligent display terminal; and the sending, according to the display content information, a data stream corresponding to the display content information to the target intelligent display terminal comprises:

sending, according to the display content information and the address information of the second intelligent display terminal, the data stream corresponding to the display content information to the target intelligent display terminal.

10. The method according to claim 2, wherein before the sending, according to the display content information, a data stream corresponding to the display content information to the target intelligent display terminal, the method further comprises:

sending switch confirmation information to the first intelligent display terminal, wherein the switch confirmation information is configured so that the first intelligent display terminal closes the display content.

11. The method according to claim 3, wherein before the sending, according to the display content information, a data stream corresponding to the display content information to the target intelligent display terminal, the method further comprises:

sending switch confirmation information to the first intelligent display terminal, wherein the switch confirmation information is configured so that the first intelligent display terminal closes the display content.

12. The method according to claim 2, wherein the display content information comprises at least one of following information: a name of the display content, a play progress of the display content, and a resource index of the display content.

13. The method according to claim 3, wherein the display content information comprises at least one of following information: a name of the display content, a play progress of the display content, and a resource index of the display content.

14. The method according to claim 4, wherein the display content information comprises at least one of following information: a name of the display content, a play progress of the display content, and a resource index of the display content.

* * * * *